United States Patent [19]

King

[11] 3,886,904

[45] June 3, 1975

[54] ARTIFICIAL SEA WATER SOLUTION AND COMPOSITION FOR MAKING THE SAME

[75] Inventor: John M. King, Mentor, Ohio

[73] Assignee: Aquarium Systems, Inc., Eastlake, Ohio

[22] Filed: July 20, 1973

[21] Appl. No.: 381,164

[52] U.S. Cl. .................................................. 119/3
[51] Int. Cl. ............................................ A01k 61/00
[58] Field of Search .................................. 119/3, 2

[56] References Cited
UNITED STATES PATENTS

| | | | |
|---|---|---|---|
| 3,473,509 | 10/1969 | Miyamura | 119/2 |
| 3,585,967 | 6/1971 | Kelley et al. | 119/3 |
| 3,623,455 | 11/1971 | Kelley et al. | 119/3 |

Primary Examiner—Hugh R. Chamblee
Attorney, Agent, or Firm—Donnelly, Maky, Renner & Otto

[57] ABSTRACT

An artificial sea water solution and a solid composition for making such a solution by dissolving in water. The solution may include, in addition to water, the following ions: sodium, magnesium, calcium, potassium, strontium, manganese, lithium, aluminum, rubidium, zinc, ferric, cobalt, copper, chloride, sulfate, carbonate, borate, orthophosphate, molybdate, thiosulfate, bromide, iodide, ethylene diamine tetra-acetic acid, silicate and fluorine. Additional trace elements of tin, selenium, nickel, and chromium are also desirably included in the solution.

24 Claims, No Drawings

ARTIFICIAL SEA WATER SOLUTION AND COMPOSITION FOR MAKING THE SAME

This invention relates generally as indicated to certain improvements in artificial sea water solutions and compositions for making the same generally of the type disclosed in U.S. Pat. No. 3,623,455, granted Nov. 30, 1971, which is satisfactory not only for the live culture of marine fish and invertebrates such as anemones, octopuses and brittle stars, but also for plant (algae) and diatom growth.

The use of artificial or synthetic sea water is extremely old, dating back at least as far as about 1854, when Gosse experimented with simple mixtures of available chemicals for use in marine aquariums when natural sea water was inaccessible. The composition of such mixtures and other similar mixtures used in the early days generally comprised only the four major salts found in natural sea water. The solutions formed when such compositions were dissolved in water required an inoculation of sea weed or some similar living organism to make them suitable for the more delicate forms of marine life, such as invertebrates. Such solutions, even when so inoculated, however, have met with only limited success and acceptance, primarily due to the inability to maintain successfully the invertebrate marine life.

The principal reason for the failure of the previously known compositions is believed to reside primarily in the approach taken to the problem, as it has generally been considered necessary to provide as close a facsimile as possible to actual sea water. The difficulty and the complexity of this task are enormous, however, since the oceans are believed to contain most of the naturally occurring elements known to man. Moreover, including the hydrogen and oxygen combined in the molecules of water, only 14 of the elements occur in concentrations of at least 1 part per million, with most of the elements occurring at considerably less than 1 part per million.

In more recent times, it has been attempted to provide a more suitable composition by producing the artificial medium in which the marine animals would best be maintained, regardless of how closely such medium resembles the composition of naturally occurring sea water. In achieving a suitable composition, the actual composition of sea water was, of course, used as a general guide in the formulation. It was recognized, however, that because sea water is so complex and therefore so extremely difficult to duplicate, it might be advisable to concentrate more on the needs of the various animals and to produce a composition and solution which would fulfill these needs. In achieving this result, the invertebrates present the major problems in that some are considerably more sensitive to the composition of the culture medium, and thus need different ingredients to be maintained successfully. It has been found that invertebrates may be successfully cultured if the artificial composition includes some of the "trace" elements, i.e., the elements which are present in only minute quantities in naturally occurring sea water (less than 1 part per million). However, not all of such elements are required or desired, and not in the same quantities or ratios as found in naturally occurring sea water.

Compositions of this type have been used with considerable success, but have had several practical disadvantages. For example, the materials for such compositions have been available in four separate and distinct parts which must be intermixed to form a single solution, which considerably complicates packaging and handling as well as the dissolving of the various parts to form the complete solution.

To overcome such disadvantages, a two-part composition has been proposed as shown in the following Table I.

TABLE I

| BASIC SALTS: Compound | Formula | Grade | % by weight | Amount (grams)[1] | |
|---|---|---|---|---|---|
| Sodium chloride (salt) | NaCl | Tech. | 65.270 | 10,432.625 | (23.0 lb.) |
| Magnesium sulfate | $MgSO_4$ | do. | 16.318 | 2,608.156 | ( 5.75 " ) |
| Magnesium chloride | $MgCl_2$ | do. | 12.770 | 2,041.166 | ( 4.5 " ) |
| Calcium chloride | $CaCl_2$ | do. | 3.266 | 521.631 | ( 1.15 " ) |
| Potassium chloride | KCl | do. | 1.738 | 277.825 | ( 9.8 oz.) |
| Sodium, Acid (Baking soda) | $NaHCO_3$ | do. | .4966 | 79.379 | ( 2.8 " ) |
| Strontium chloride | $SrCl_2.6H_2O$ | A.R. | .04692 | 7.500 | |
| Manganese sulfate | $MnSO_4.H_2O$ | do. | .009384 | 1.500 | |
| Sodium orthophosphate, mono-H | $Na_2HPO_4.7H_2O$ | do. | .009384 | 1.500 | |
| Lithium chloride | LiCl | do. | 0.002346 | .375 | |
| Sodium molybdate | $Na_2MoO_4.2H_2O$ | do. | .0002346 | .375 | |
| Sodium thiosulfate (hypo) | $Na_2S_2O_3.5H_2O$ | do. | .0002346 | .375 | |
| | | Totals | 99.9249918 | 15,972.407 | (35.213 lb.) |

| TRACE ELEMENTS: Compound | Formula | Grade | % by weight | Amount (grams)[1] | Amount times 25[2] |
|---|---|---|---|---|---|
| Potassium bromide | KBr | A.R. | .06753 | 10.795 (.3808 oz) | 269.89 (9.52 oz) |
| Calcium d-gluconate* | $Ca(C_6H_{11}O_7)_2.H_2O$ | U.S.P. | .0001564 | .25 | 6.25 |
| Aluminum sulfate* | $Al_2(SO_4)_3$ | A.R. | .0001126 | .18 | 4.5 |
| Rubidium chloride | RbCl | do. | .00003754 | .06 | 1.5 |
| Zinc sulfate | $ZnSO_4$ | do. | .00002402 | .0384 | .96 |
| Potassium iodine | KI | do. | .00002252 | .036 | .9 |
| Cobalt sulfate* | $CoSO_4$ | Feed | .00001251 | .02 | .5 |
| Copper sulfate | $CuSO_4.5H_2O$ | A.R. | .000002502 | .004 | .1 |
| *requires heat to dissolve | | Totals | .067898092 | 11.3834(.02509 lb) | 284.60 (.627 lb) |
| | | Grand Totals | 99.992889892 | 35.238 lb. | |

[1] Amount to make 100 Gal of artificial sea water.
[2] Use Amount times 25 of the trace elements and mix with 4 Liters distilled water for a trace element stock solution. Sufficient for 25 batches of sea water.

The composition shown in Table I has been used with remarkable success. However, as disclosd in the aforementioned U.S. Pat. No. 3,623,455, which is incorporated herein by reference, further research in this area has shown that certain types of plant and animal life require additional substances if they are to be maintained satisfactorily for extended periods of time. For example, the presence of ferric ions in the solution has been found to promote the growth of nitrifying bacteria, which assist in controlling the pH of the solution and oxidize toxic nitrogen compounds excreted by animals being cultured in the solution. Similarly, it has been discovered that borate ions are required by some plant life, for example, brown algae, to be maintained successfully. Borate ions have also been found to assist in buffering and controlling the pH of the solution.

It has also been discovered that vanadium ions in the solution are beneficial. The presence of a small quantity of such ions, such as about 0.02 ppm, enables certain families of tunicates to be maintained successfully over extended periods of time.

The inclusion of such ions in an artificial sea water solution, however, is not effected as simply as might be believed, due primarily to the complexity of the solution. For example, the pH of the solution must be maintained within carefully controlled limits if the captive marine life is to survive. Since the presence of additional ions in such solution affects these requirements, the quantity thereof must be very carefully controlled.

Moreover, it has been found that ferric ions at the pH at which the solution will normally be maintained (approximately 8.0 to about 8.4) tend to react with hydroxide and carbonate ions and precipitate out of solution very rapidly. Consequently, it is necessary to provide a way in which the ferric ions can be maintained in solution.

While the presence of each of these additional ferric, borate, and vanadium ions in the solution are preferred to provide an ideal solution for various types of plant and animal life, any one or all of these additional ingredients may be selectively included or omitted and the solution will still have utility for certain types of animals and plant life. Each of these additional ferric, borate, and vanadium ions performs a specific function noted above which is not dependent on the other additional ingredients.

Further research has also shown that specified amounts of silicates are necessary for diatom growth, and that specified amounts of fluorine are also necessary for marine vertebrates in order to assimilate the calcium that is required for their normal bone development. These latter two additional ingredients are preferably utilized in combination with the other additional ferric, borate, and vanadium ions referred to above, but it will be apparent that one or both of these additional silicate and fluorine ions may be utilized in the composition with or without the other additional ingredients, since like the various ferric, borate, and vanadium ions, the silicate and fluorine ions each perform a specific function in the solution which is not dependent on the other additional ingredients.

It has also been found desirable to include additional trace elements of tin, selenium, nickel, and chromium in the solution, but it should be appreciated that one or more of these additional trace elements may be selectively omitted or included and the solution will still have utility for certain types of animals and plant life as previously described.

In addition, it has been found that using two different types of magnesium chloride, hydrous and anhydrous, provides immediate pH control of the solution in the optimum range of 8.0 to 8.4. If only the hydrous form or the anhydrous form is used, the immediate pH is generally too high or too low, respectively, requiring the medium to be bubbled anywhere from 8 to 24 hours to obtain optimum pH.

It is therefore a principal object of this invention to provide an improved artificial sea water solution and compositions for making the same which is highly successful in the culture and maintenance of various forms of marine life over extended periods of time.

Another object is to provide such an improved artificial sea water solution which may include the desirable silicate ions preferably but not necessarily in combination with the desirable borate, vanadium and ferric ions in solution, and to provide compositions from which such a solution can be made.

Still another object is to provide such an improved artificial sea water solution which may include the desirable fluorine ions preferably but not necessarily in combination with the desirable silicate, borate, vanadium and ferric ions in solution.

A further object is to provide such an improved artificial sea water solution which may but need not necessarily include two types of magnesium chloride, hydrous and anhydrous, to provide substantially immediate pH control of the solution in the optimum range.

Another object is to provide such an improved artificial sea water solution and compositions for making the same which are capable of use in any existing aquarium culture system.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principles of the invention may be employed.

The improved artificial sea water of this invention is an aqueous solution containing, in one formulation, the following ions in the indicated concentration.

| ION | CONCENTRATION, ppm |
| --- | --- |
| Cl | 18400 |
| Na | 10220 |
| $SO_4$ | 2518 |
| Mg | 1238 |
| K | 370 |
| Ca | 390 |
| $HCO_3$ | 142 |
| $H_3BO_3$ | 25 |
| Br | 60 |
| Sr | 6 |
| $SiO_3$ | 3 |
| F | 1.0 |
| $PO_4$ | 1.3 |
| Mn | 1.2 |
| $MoO_4$ | .6 |
| $S_2O_3$ | .3 |
| Li | .2 |
| Rb | .1 |
| I | .07 |
| EDTA | .06 |
| Al | .04 |
| Zn | .02 |
| V | .02 |
| Co | .01 |
| Fe | .01 |
| Cu | .003 |

The specific ions and indicated concentrations listed above are substantially the same as those given in column 2 of U.S. Pat. No. 3,623,455 except for slight variations in the concentrations of certain ones of the ions and of course the presence of the two additional silicate and fluorine ions in the indicated concentrations. It has been found, for example, that increasing the calcium from 370 ppm to approximately 390 ppm will improve the medium for crustaceans, e.g. lobsters, shrimp, copepods, and so on. Also, increasing the bromide from 20 ppm to approximately 60 ppm greatly aids in the growth of certain halophytic algal species.

In addition to the foregoing, it has been found desirable to add the following optional trace elements in the indicated concentrations:

| ION | CONCENTRATION, ppm |
| --- | --- |
| Sn | .001 |
| Ni | .0008 |
| Se | .0004 |
| Cr | .00004 |

To produce the sea water solution, the necessary materials are furnished in convenient form. One example is a composition consisting of two separate parts. The first part is a relatively homogeneous mixture of solid basic salts in comminuted form and the second part is a concentrated solution in water of the balance of the necessary materials.

One preferred formulation of the aforenoted two-part composition is set forth in the following Table II.

One procedure employed for obtaining the artificial sea water solution from the composition set forth in Table II is as follows. The required amounts of the basic salts listed in the first part of Table II are placed in a suitable mixing tank, and a hard stream of water which may be ordinary tap water is directed into the basic salts to dissolve the chemicals. Additional water is added to fill the container to the level of the desired specific gravity of the solution, with the total amount of water being, for example, 100 gallons. As indicated by the foregoing Table II, a small amount of sodium thiosulfate may be included in the composition to neutralize the chlorine usually present in tap water, as otherwise the residual chlorine will displace the ionic bromine and iodine as these have a lower position in the electromotive series. However, it will be apparent that if the water being used to make the solution does not contain objectionable amounts of chlorine, there is no need to include the sodium thiosulfate in the composition.

A stock solution of the trace elements listed in the second part of Table II is then prepared, preferably using liquid stock solutions of the various ingredients to facilitate assembly of the solution and to give better quantitative accuracy, since this permits the weighing out of relatively larger amounts of the individual solutions. Aluminum sulfate is dissolved by heat which is conveniently achieved prior to mixing with the other ingredients. Calcium gluconate, $Ca(C_6H_{11}O_7)_2 \cdot H_2O$, may also be included in the solution as one of the trace elements or omitted as desired. If calcium gluconate is included in the solution, it will likewise be dissolved by

TABLE II

| Compound | Formula | Grade | Percent by Weight | Amount(1) | |
| --- | --- | --- | --- | --- | --- |
| Sodium chloride | NaCl | Tech | 67.90677 | 9761.037 | (21.520 lbs.) |
| Magnesium sulfate | $MgSO_4 \cdot 7H_2O$ | Tech | 16.99378 | 2442.716 | ( 5.385 lbs.) |
| Magnesium chloride | $MgCl_2 \cdot 6H_2O$ | Tech | 4.43415 | 637.372 | ( 1.405 lbs.) |
| Magnesium chloride (anhydrous) | $MgCl_2$ | Tech | 4.15334 | 597.008 | ( 1.316 lbs.) |
| Calcium chloride | $CaCl_2 \cdot H_2O$ | Tech | 3.76753 | 541.552 | ( 1.194 lbs.) |
| Potassium chloride | KCl | Tech | 1.85799 | 267.071 | ( .589 lbs.) |
| Sodium bicarbonate | $NaHCO_3$ | Tech | .51721 | 74.344 | ( .164 lbs.) |
| Sodium bromide | NaBr | A.R. | .20348 | 29.249 | |
| Boric Acid | $H_3BO_3$ | A.R. | .06476 | 9.309 | |
| Strontium chloride | $SrCl_2 \cdot 6H_2O$ | A.R. | .04899 | 7.042 | |
| Sodium silicate | $Na_2SiO_3 \cdot 5H_2O$ | A.R. | .02204 | 3.168 | |
| Manganese sulfate | $MnSO_4 \cdot H_2O$ | A.R. | .00977 | 1.405 | |
| Sodium floride | NaF | A.R. | .00582 | .837 | |
| Sodium orthophosphate | $NaHPO_4$ | A.R. | .00518 | .744 | |
| Lithium chloride | LiCl | A.R. | .00244 | .351 | |
| Sodium molybdate | $NaMoO_4 \cdot H_2O$ | A.R. | .00244 | .351 | |
| Sodium thiosulfate | $Na_2S_2O_3 \cdot 5H_2O$ | A.R. | .00156 | .224 | |
| | | | 99.99725 | 14373.780 | (31.689 lbs.) |
| Aluminum sulfate | $Al_2(SO_4)_3 \cdot 18H_2O$ | A.R. | .0012522 | .180 | |
| Rubidium chloride | RbCl | A.R. | .0004174 | .060 | |
| Zinc sulfate | $ZnSO_4 \cdot 7H_2O$ | A.R. | .0002644 | .038 | |
| Potassium iodide | KI | A.R. | .0002505 | .036 | |
| Monosodium ferric ethlendiaminetetra-acetate | EDTA NaFe | A.R. | .0002018 | .029 | |
| Vanadyl sulfate | $VOSO_4 \cdot 2H_2$ | A.R. | .0001670 | .024 | |
| Cobalt sulfate | $CoSO_4 \cdot 7H_2O$ | A.R. | .0001391 | .020 | |
| Copper sulfate | $CuSO_4 \cdot 5H_2O$ | A.R. | .0000278 | .004 | |
| Stannous chloride | $SnCl_2 \cdot 2H_2O$ | A.R. | .0000501 | .00072 | |
| Nickel chloride | $NiCl_2 \cdot 6H_2O$ | A.R. | .0000087 | .00125 | |
| Sodium selenate | $Na_2SeO_4 \cdot 10H_2O$ | A.R. | .0000049 | .00071 | |
| Potassium chromate | $K_2CrO_7$ | A.R. | .0000006 | .00009 | |
| | | | .0027845 | .39377 | |
| | | | 100.0000345 | 14374.174 | (31.690 lbs.) |

(1) Amount in grams/100 gallons heat. After the trace element stock solution has been prepared, 160 ml of such solution is added to the basic salt solution to produce a total quantity of 100 gallons of artificial sea water.

Although such a two-part composition is preferred, the number of parts used in the composition forms no part of the present invention, and it will be apparent that the composition may consist of as many parts as the number of ingredients which make up the composition.

Moreover, although the formulation set forth in Table II is, in general, preferred, it is to be understood that the solid formulation is only for the purpose of supplying the desired ions when dissolved in water. Consequently, other salts, or combinations of salts, may be used as the sources of the ions as long as the same ions in similar relative proportions are provided in the solution. For example, the magnesium of the foregoing formulation may be in the form of magnesium chloride if the amount of the latter is increased by an amount equivalent to the magnesium sulfate of such formulation. The sulfate ion may then be furnished in the form of sodium sulfate in an amount equivalent to the magnesium sulfate shown in Table II and the amount of sodium chloride reduced by an amount equivalent to the magnesium sulfate. Similarly, in the solution of trace elements, different anions may be employed as long as the effectiveness and concentration of the solution are not altered. Illustrative examples of such variations include the use of rubidium sulfate, aluminum chloride, copper chloride and cobalt chloride.

It has been found that especially beneficial results are obtained in handling of the composition to produce the aqueous solution and in the rate of dissolution of the ingredients if the magnesium sulfate and other ingredients which normally contain water of crystallization are in anhydrous form. Magnesium chloride which is commercially available in hydrated form contains 6 molecules of water per molecule of salt and is highly hygroscopic as well as deliquescent. Upon absorbing moisture as from the atmosphere, it begins to go partly into solution and forms a sticky mass. In the formulation used in this invention, the moisture which is required to cause this effect may be found in any of the other materials in the same package which also contain water of crystallization.

For these reasons, it is advantageous to have all of the materials of the solid composition contain a minimum of water as water of crystallization. The two constituents which most importantly should be in relatively anhydrous form are magnesium sulfate and calcium chloride. By having all of the major constituents in anhydrous form, it is possible to prepare a single package of the solid materials if such materials are properly comminuted and thoroughly mixed.

However, it has also been found that by using two different types of magnesium chloride, hydrous and anhydrous, in the relative percentages indicated in Table II on page 9 and Table III on page 13, immediate pH control of the solution in the optimum range of 8.0 to 8.4 may be obtained. If only the hydrous form or the anhydrous form is used, the immediate pH is generally too high or too low, respectively, requiring the medium to be bubbled anywhere from 8 to 24 hours to obtain optimum pH.

It is also permissible to have a certain amount of variation in the quantity of the individual ingredients as such variation will not materially affect the suitability of the solution for the culture and maintenance of the various forms of marine life. Accordingly, the quantity of the indicated ingredients may vary as shown in the following Table III.

TABLE III

| Compound | Tolerance | % by weight | |
| --- | --- | --- | --- |
| NaCl | ± 1% | 68.59 | 67.23 |
| $MgSO_4.7H_2O$ | | 17.16 | 16.82 |
| $MgCl_2.6H_2O$ | | 4.47 | 4.39 |
| $MgCl_2$ | | 4.19 | 4.11 |
| $CaCl_2.2H_2O$ | | 3.81 | 3.73 |
| KCl | | 1.876 | 1.840 |
| $NaHCO_3$ | | 0.522 | 0.512 |
| NaBr | | 0.2055 | 0.2015 |
| $H_3BO_3$ | ± 5% | 0.0680 | 0.0615 |
| $SrCl_2.6H_2O$ | | 0.0514 | 0.0465 |
| $Na_2SiO_3.5H_2O$ | | 0.0231 | 0.0209 |
| $MnSO_4.H_2O$ | | 0.01030 | 0.00928 |
| NaF | | 0.00611 | 0.00553 |
| $NaHPO_4$ | | 0.00544 | 0.00492 |
| LiCl | ± 10% | 0.00268 | 0.00220 |
| $NaMoO_4.H_2O$ | | 0.00268 | 0.00220 |
| $Na_2S_2O_3.5H_2O$ | | 0.00172 | 0.00140 |
| $Al_2(SO_4)_3.18H_2O$ | | 0.00138 | 0.00113 |
| RbCl | | 0.000459 | 0.000376 |
| $ZnSO_4.7H_2O$ | | 0.000291 | 0.000238 |
| KI | | 0.000276 | 0.000225 |
| EDTA NaFe | | 0.000222 | 0.000182 |
| $VOSO_4.2H_2O$ | | 0.000184 | 0.000150 |
| $CoSO_4.7H_2O$ | | 0.000153 | 0.000125 |
| $CuSO_4.5H_2O$ | | 0.0000306 | 0.0000250 |
| $SnCl_2.2H_2O$ | | 0.0000551 | 0.0000451 |
| $NiCl_2.6H_2O$ | | 0.0000096 | 0.0000078 |
| $Na_2SeO_4.10H_2O$ | | 0.0000054 | 0.0000044 |
| $K_2CrO_7$ | | 0.0000007 | 0.0000005 |

When a synthetic sea water solution is made from the composition set forth in Table II, the ionic composition of the solution will be as shown in Table IV which follows. Table IV also shows the ionic composition of solutions prepared from compositions of the ranges of ingredients set forth in Table III.

TABLE IV

| ION | CONCENTRATION, ppm | |
|---|---|---|
| | (1) | (2) |
| Cl | 18400 | 18216 | 18584 |
| Na | 10220 | 10118 | 10322 |
| $SO_4$ | 2518 | 2493 | 2543 |
| Mg | 1238 | 1226 | 1250 |
| K | 370 | 366.3 | 373.7 |
| Ca | 390 | 386.1 | 393.9 |
| $HCO_3$ | 142 | 140.6 | 143.4 |
| Br | 60 | 59.4 | 60.6 |
| $H_3BO_3$ | 25 | 23.75 | 26.25 |
| Sr | 6 | 5.7 | 6.3 |
| $SiO_3$ | 3 | 2.85 | 3.15 |
| F | 1.0 | 0.95 | 1.05 |
| $PO_4$ | 1.3 | 1.24 | 1.37 |
| Mn | 1.2 | 1.14 | 1.26 |
| $MoO_4$ | .6 | 0.54 | 0.66 |
| $S_2O_3$ | .3 | 0.27 | 0.33 |
| Li | .2 | 0.18 | 0.22 |
| Rb | .1 | 0.09 | 0.11 |
| I | .07 | 0.063 | 0.077 |
| EDTA | .06 | 0.054 | 0.066 |
| Al | .04 | 0.036 | 0.044 |
| Zn | .02 | 0.018 | 0.022 |
| V | .02 | 0.018 | 0.022 |
| Co | .01 | 0.009 | 0.011 |
| Fe | .01 | 0.009 | 0.011 |
| Cu | .003 | 0.0027 | 0.0033 |
| Sn | .001 | 0.0009 | 0.0011 |
| Ni | .0008 | 0.00072 | 0.00088 |
| Se | .0004 | 0.00036 | 0.00044 |
| Cr | .00004 | 0.000036 | 0.000044 |

(1) Composition of Table II
(2) Range of Composition of Table III

One of the principal difficulties in achieving the composition of the present invention resides in the magnesium and calcium chlorides which are necessary major basic salts. Calcium and magnesium chloride are difficult to store since they have a strong tendency to interact with the other ingredients, particularly in the high concentrations of the gross components which are used. Calcium chloride may react with the magnesium sulfate to form magnesium chloride and calcium sulfate which are relatively less soluble. To overcome such difficulties, it is necessary to be extremely careful of the moisture content of the various ingredients and particularly of the calcium chloride and/or magnesium sulfate, prior to and during storage. When the composition is dissolved in water, the calcium chloride may initially react with the magnesium sulfate to form a very slight precipitate, but the amount of such precipitate will be very small and will readily redissolve when diluted to the desired strength.

To achieve the desired borate ions in the solution a small quantity of boric acid, as shown in the aforesaid table, is included in the first part of the composition. As mentioned, the quantity of boric acid has to be carefully controlled, since the presence of this ingredient increases the hydrogen ion concentration of the solution and hence affects the pH of the solution.

The desired ferric ions are provided as a part of the solution of trace elements in the form of a chelated compound, monosodium ferric ethylendiaminetetra-acetate, which serves as a sequestering agent for the ferric ions and precludes reaction with hydroxide or carbonate ions. The ferric ions are then available in the sea water solution to assist in promoting the growth of nitrifying bacteria which will convert the nitrogen appearing in the solution to the non-toxic nitrate form. Such chelated compound is commercially available, one source being Geigy Chemical Co. under the trade name "Sequestrene".

While each of the Tables II, III and IV include each of the preferred additional ferric, borate, vanadium, silicate, and fluorine ingredients, the elimination of any one or more of these ingredients is permissible without having any adverse effect on the other remaining additional ingredients in carrying out their associated functions enumerated above, since each of the additional ingredients performs a specific function which is not dependent on the other additional ingredients. Likewise, the sodium thiosulfate could also be eliminated from the composition particularly when the water used to make the solution does not contain any objectionable amounts of chlorine without adversely affecting the function of the various other additional ingredients. Nor will the omission of any of the additional ingredients including sodium thiosulfate have any noticeable effect on the relative percents of the other specified ingredients because of the relatively small amount of the former ingredients involved. These amounts when distributed among the various other ingredients in the relative disclosed proportions have so little effect on the relative disclosed percentages of the other ingredients that they still remain well within the disclosed ranges of ingredients set forth in Tables III and IV.

If calcium gluconate is included in the solution, approximately 0.0017% by weight, ± 10%, will be used. This compound will be included in the solution of trace elements in the preferred two-part formulation. In the solution of ions, about 0.54 to about 0.66 ppm of $C_6H_{11}O_7^-$ will be present.

The artificial sea water solution and composition of this invention are suitable for use in any type of aquarium culture system, either home or commercial. The solution and composition are also suitable for use in such commercial operations as lobster houses or similar operations where it is necessary to maintain salt water marine life alive indefinitely.

The embodiments of the invention in which an exclusive property or privilege is claimed are defined as follows:

1. A composition which, when dissolved in water, produces an artificial sea water solution, said composition comprising the following ingredients based on the total weight of said composition: about 67.23 to about 68.59 weight percent sodium chloride, about 16.82 to about 17.16 weight percent magnesium sulfate, about 8.50 to about 8.66 weight percent magnesium chloride, about 3.73 to about 3.81 weight percent calcium chloride, about 1.84 to about 1.89 weight percent potassium chloride, about 0.512 to about 0.522 weight percent sodium bicarbonate, about 0.202 to about 0.206 weight percent sodium bromide, about 0.0465 to about 0.0514 weight percent strontium chloride, about 0.0209 to about 0.0231 weight percent sodium silicate, about 0.00928 to about 0.01030 weight percent manganese sulfate, about 0.00492 to about 0.00544 weight percent sodium orthophosphate, about 0.00220 to about 0.00268 weight percent lithium chloride, about 0.00220 to about 0.00268 weight percent sodium molybdate, about 0.00113 to about 0.00138 weight percent aluminum sulfate, about 0.000376 to about 0.000459 weight percent rubidium chloride, about 0.000238 to about 0.000291 weight percent zinc sulfate, about 0.000225 to about 0.000276 weight percent potassium iodide, about 0.000125 to about 0.000153 weight percent cobalt sulfate, and about 0.0000250 to about 0.0000306 weight percent copper sulfate.

2. The composition of claim 1 dissolved in water to produce the following ionic concentration: about 18216 to about 18584 ppm Cl, about 10118 to about 10322 ppm Na, about 2475 to about 2525 ppm $SO_4$, about 1226 to about 1250 ppm Mg, about 366.3 to about 373.7 ppm K, about 386.1 to about 393.9 ppm Ca, about 140.6 to about 143.4 ppm $HCO_3$, about 59.4 to about 60.6 ppm Br, about 5.7 to about 6.3 ppm Sr, about 2.85 to about 3.15 ppm $SiO_3$, about 1.24 to about 1.37 ppm $PO_4$, about 1.14 to about 1.26 ppm Mn, about 0.54 to about 0.66 ppm $MoO_4$, about 0.18 to about 0.22 ppm Li, about 0.09 to about 0.11 ppm Rb, about 0.063 to about 0.071 ppm I, about 0.036 to about 0.044 ppm Al, about 0.018 to about 0.022 ppm Zn, about 0.009 to about 0.011 ppm Co, and about 0.0027 to about 0.0033 ppm Cu.

3. The composition of claim 1 wherein there is about 67.91 weight percent of said sodium chloride, about 16.99 weight percent of said magnesium sulfate, about 8.59 weight percent of said magnesium chloride, about 3.77 weight percent of said calcium chloride, about 1.86 weight percent of said potassium chloride, about 0.517 weight percent of said sodium bicarbonate, about 0.203 weight percent of said sodium bromide, about 0.049 weight percent of said strontium chloride, about 0.022 weight percent of said sodium silicate, about 0.0098 weight percent of said manganese sulfate, about 0.00519 weight percent of said sodium orthophosphate, about 0.00244 weight percent of said lithium chloride, about 0.00244 weight percent of said sodium molybdate, about 0.00125 weight percent of said aluminum sulfate, about 0.000417 weight percent of said rubidium chloride, about 0.000264 weight percent of said zinc sulfate, about 0.000251 weight percent of said potassium iodide, about 0.000139 weight percent of said cobalt sulfate, and about 0.0000278 weight percent of said copper sulfate.

4. The composition of claim 1 further comprising the following additional ingredients based on the total weight of said composition: about 0.0615 to about 0.0680 weight percent boric acid, about 0.0014 to about 0.0017 weight percent sodium thiosulfate, about 0.00018 to about 0.00022 weight percent monosodium ferric ethylene diamine tetra-acetate, and about 0.00015 to about 0.00018 weight percent vanadyl sulfate.

5. The composition of claim 1 further comprising about 0.0055 to about 0.0061 weight percent sodium fluoride.

6. The composition of claim 1 wherein said about 8.50 to about 8.66 weight percent magnesium chloride consists of about 4.39 to about 4.47 weight percent hydrous magnesium chloride and about 3.73 to about 3.81 anhydrous magnesium chloride.

7. The composition of claim 6 wherein there is about 4.43 weight percent of said hydrous magnesium chloride and about 4.15 weight percent of said anhydrous magnesium chloride.

8. The composition of claim 1 further comprising about 0.0000451 to about 0.0000551 stannous chloride.

9. The composition of claim 1 further comprising about 0.0000078 to about 0.0000096 nickel chloride.

10. The composition of claim 1 further comprising about 0.0000044 to about 0.0000054 sodium selenate.

11. The composition of claim 1 further comprising about 0.0000005 to about 0.0000007 weight percent potassium chromate.

12. A synthetic sea water solution comprising an aqueous solution having the following ionic concentration: about 18216 to about 18584 ppm Cl, about 10118 to about 10322 ppm Na, about 2493 to about 2543 ppm $SO_4$, about 1226 to about 1250 ppm Mg, about 366.3 to about 373.7 ppm K, about 386.1 to about 393.9 ppm Ca, about 140.6 to about 143.4 ppm $HCO_3$, about 59.4 to about 60.6 ppm Br, about 5.7 to about 6.3 ppm Sr, about 2.85 to about 3.15 ppm $SiO_3$, about 1.24 to about 1.37 ppm $PO_4$, about 1.14 to about 1.26 ppm Mn, about 0.54 to about 0.66 ppm $MoO_4$, about 0.18 to about 0.22 ppm Li, about 0.09 to about 0.11 ppm Rb, about 0.063 to about 0.077 ppm I, about 0.036 to about 0.044 ppm Al, about 0.018 to about 0.022 ppm Zn, about 0.009 to about 0.011 ppm Co, and about 0.0027 to about 0.0033 ppm Cu.

13. The solution of claim 12 wherein there is about 18400 ppm of said Cl, about 10220 ppm of said Na, about 2518 ppm of said $SO_4$, about 1238 ppm of said Mg, about 370 ppm of said K, about 390 ppm of said Ca, about 142 ppm of said $HCO_3$, about 60 ppm of said Br, about 6 ppm of said Sr, about 3 ppm of said $SiO_3$, about 1.3 ppm of said $PO_4$, about 1.2 ppm of said Mn, about 0.6 ppm of said $MoO_4$, about 0.2 ppm of said Li, about 0.1 ppm of said Rb, about 0.07 ppm of said I, about 0.04 ppm of said Al, about 0.02 ppm of said Zn, about 0.01 ppm of said Co, and about 0.003 ppm of said Cu.

14. The solution of claim 12 further comprising about 0.0009 to about 0.0011 ppm Sn.

15. The solution of claim 12 further comprising about 0.00072 to about 0.00088 ppm Ni.

16. The solution of claim 12 further comprising about 0.00036 to about 0.00044 ppm Se.

17. The solution of claim 12 further comprising about 0.000036 to about 0.000044 ppm Cr.

18. A composition which, when dissolved in water, produces an artificial sea water solution, said composition comprising the following ingredients based on the total weight of said composition: about 67.23 to about 68.59 weight percent sodium chloride, about 16.82 to about 17.16 weight percent magnesium sulfate, about 8.50 to about 8.66 weight percent magnesium chloride, about 3.73 to about 3.81 weight percent calcium chloride, about 1.84 to about 1.88 weight percent potassium chloride, about 0.512 to about 0.522 weight percent sodium bicarbonate, about 0.202 to about 0.206 weight percent sodium bromide, about 0.0465 to about 0.0514 weight percent strontium chloride, about 0.0055 to about 0.0061 weight percent sodium fluoride, about 0.00928 to about 0.01030 weight percent manganese sulfate, about 0.00492 to about 0.00544 weight percent sodium orthophosphate, about 0.00220 to about 0.00268 weight percent lithium chloride, about 0.00220 to about 0.00268 weight percent sodium molybdate, about 0.00113 to about 0.00138 weight percent aluminum sulfate, about 0.000376 to about 0.000459 weight percent rubidium chloride, about 0.000238 to about 0.000291 weight percent zinc sulfate, about 0.000225 to about 0.000276 weight percent potassium iodide, about 0.000125 to about 0.000153 weight percent cobalt sulfate, and about 0.0000250 to about 0.0000306 weight percent copper sulfate.

19. The composition of claim 18 dissolved in water to produce the following ionic concentration: about 18216 to about 18584 ppm Cl, about 10118 to about 10322 ppm Na, about 2493 to about 2543 ppm $SO_4$, about 1226 to about 1250 ppm Mg, about 366.3 to about 373.7 ppm K, about 386.1 to about 393.9 ppm Ca, about 140.6 to about 143.4 ppm $HCO_3$, about 59.4 to about 60.6 ppm Br, about 5.7 to about 6.3 ppm Sr, about 0.95 to about 1.05 ppm F, about 1.24 to about 1.37 ppm $PO_4$, about 1.14 to about 1.26 ppm Mn, about 0.54 to about 0.66 ppm $MoO_4$, about 0.18 to about 0.22 ppm Li, about 0.09 to about 0.11 ppm Rb, about 0.063 to about 0.077 ppm I, about 0.036 to about 0.044 ppm Al, about 0.018 to about 0.022 ppm Zn, about 0.009 to about 0.011 ppm Co, and about 0.0027 to about 0.0033 ppm Cu.

20. The composition of claim 18 wherein there is about 67.91 weight percent of said sodium chloride, about 16.99 weight percent of said magnesium sulfate, about 8.59 weight percent of said magnesium chloride, about 3.77 weight percent of said calcium chloride, about 1.86 weight percent of said potassium chloride, about 0.517 weight percent of said sodium bicarbonate, about 0.203 weight percent of said sodium bromide, about 0.049 weight percent of said strontium chloride, about 0.0058 weight percent of said sodium fluoride, about 0.0098 weight percent of said manganese sulfate, about 0.00519 weight percent of said sodium orthophosphate, about 0.00244 weight percent of said lithium chloride, about 0.00244 weight percent of said sodium molybdate, about 0.00125 weight percent of said aluminum sulfate, about 0.000417 weight percent of said rubidium chloride, about 0.000264 weight percent of said zinc sulfate, about 0.000251 weight percent of said potassium iodide, about 0.000139 weight percent of said cobalt sulfate, and about 0.0000278 weight percent of said copper sulfate.

21. The composition of claim 18 further comprising the following additional ingredients based on the total weight of said composition: about 0.0615 to about 0.0680 weight percent boric acid, about 0.0014 to about 0.0017 weight percent sodium thiosulfate, about 0.00018 to about 0.00022 weight percent monosodium ferric ethylene diamine tetra-acetate, about 0.00015 to about 0.00018 weight percent vanadyl sulfate, and about 0.021 to about 0.023 weight percent sodium silicate.

22. A synthetic sea water solution comprising an aqueous solution having the following ionic concentration: about 18216 to about 18584 ppm Cl, about 10118 to about 10322 ppm Na, about 2493 to about 2543 ppm $SO_4$, about 1226 to about 1250 ppm Mg, about 366.3 to about 373.7 ppm K, about 386.1 to about 393.9 ppm Ca, about 140.6 to about 143.4 ppm $HCO_3$, about 59.4 to about 60.6 ppm Br, about 5.7 to about 6.3 ppm Sr, about 0.95 to about 1.05 ppm F, about 1.24 to about 1.37 ppm $PO_4$, about 1.14 to about 1.26 ppm Mn, about 0.54 to about 0.66 ppm $MoO_4$, about 0.18 to about 0.22 ppm Li, about 0.09 to about 0.11 ppm Rb, about 0.063 to about 0.077 ppm I, about 0.036 to about 0.044 ppm Al, about 0.018 to about 0.022 ppm Zn, about 0.009 to about 0.011 ppm Co, and about 0.0027 to about 0.0033 ppm Cu.

23. The solution of claim 22 wherein there is about 18400 ppm of said Cl, about 10220 ppm of said Na, about 2518 ppm of said $SO_4$, about 1238 ppm of said Mg, about 370 ppm of said K, about 390 ppm of said Ca, about 142 ppm of said $HCO_3$, about 60 ppm of said Br, about 6 ppm of said Sr, about 1.0 ppm of said F, about 1.3 ppm of said $PO_4$, about 1.2 ppm of said Mn, about 0.6 ppm of said $MoO_4$, about 0.2 ppm of said Li, about .1 ppm of said Rb, about 0.07 ppm of said I, about 0.04 ppm of said Al, about 0.02 ppm of said Zn, about 0.01 ppm of said Co, and about 0.003 ppm of said Cu.

24. The solution of claim 22 further comprising about 23.75 to about 26.25 ppm $H_3BO_3$, about 2.85 to about 3.15 ppm $SiO_3$, about 0.009 to about 0.011 ppm Fe, about 0.054 to about 0.066 ppm EDTA. and about 0.018 to about 0.022 ppm V.

* * * * *